(12) United States Patent
Jalali et al.

(10) Patent No.: US 9,397,745 B2
(45) Date of Patent: Jul. 19, 2016

(54) HYBRID SATELLITE AND MESH NETWORK SYSTEM FOR AIRCRAFT AND SHIP INTERNET SERVICE

(75) Inventors: Ahmad Jalali, Rancho Santa Fe, CA (US); Ranganathan Krishnan, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/109,302

(22) Filed: May 17, 2011

(65) Prior Publication Data

US 2011/0286325 A1 Nov. 24, 2011

Related U.S. Application Data

(60) Provisional application No. 61/345,884, filed on May 18, 2010.

(51) Int. Cl.
*H04B 7/185* (2006.01)

(52) U.S. Cl.
CPC ........ *H04B 7/18506* (2013.01); *H04B 7/18584* (2013.01); *H04B 7/18589* (2013.01)

(58) Field of Classification Search
CPC ......... H04L 41/00; H04L 41/12; H04L 45/00; H04L 45/02; H04L 45/26; H04W 8/00; H04W 8/005; H04W 40/00; H04W 40/24; H04W 40/246; H04W 40/248
USPC ......... 370/216, 217, 218, 221, 241, 242, 244, 370/250, 252, 328, 329
See application file for complete search history.

(56) References Cited

U.S. PATENT DOCUMENTS

| | | | |
|---|---|---|---|
| 5,818,389 A | * | 10/1998 | Lazar .................. G01S 3/16 342/357.21 |
| 6,018,659 A | | 1/2000 | Ayyagari et al. |
| 6,262,659 B1 | * | 7/2001 | Korkosz et al. .......... 340/539.24 |
| 6,990,350 B2 | | 1/2006 | Davis et al. |

(Continued)

FOREIGN PATENT DOCUMENTS

| | | |
|---|---|---|
| CN | 1239848 A | 12/1999 |
| CN | 1282154 A | 1/2001 |

(Continued)

OTHER PUBLICATIONS

Frew et al., "Airborne Communication Networks for Small Unmanned Aircraft Systems", Proceedings of the IEEE, vol. 96, No. 12, Dec. 2008, pp. 2008-2027.

(Continued)

*Primary Examiner* — Feben M Haile
(74) *Attorney, Agent, or Firm* — Michael J. DeHaemer, Jr.

(57) ABSTRACT

A hybrid satellite-mesh network including a ground segment, a mobile segment and a satellite segment provides high bandwidth communication between mobile platforms and the Internet. The satellite segment is used only when mesh network communication links between mobile segment nodes and ground segment nodes are unavailable. Mobile segment nodes can function in either an access terminal mode or an access point mode to communicate with other mobile segment nodes according to a routing algorithm in a mesh portion of the network. Mobile segment nodes employ adaptive frequency reuse, link level date rate adaptation, link level power control and adaptive beam forming antennas.

20 Claims, 10 Drawing Sheets

(56) References Cited

U.S. PATENT DOCUMENTS

| | | | |
|---|---|---|---|
| 7,072,977 | B1 | 7/2006 | Bernard et al. |
| 7,107,062 | B2 * | 9/2006 | Cruz et al. ................. 455/453 |
| 7,440,451 | B2 | 10/2008 | Letney et al. |
| 8,125,961 | B2 | 2/2012 | Agrawal et al. |
| 8,385,211 | B2 * | 2/2013 | Scarlatti et al. ............ 370/238 |
| 2005/0053026 | A1 | 3/2005 | Mullan et al. |
| 2005/0232185 | A1 | 10/2005 | Hudson et al. |
| 2007/0232299 | A1 | 10/2007 | Alcorn |
| 2009/0018138 | A1 | 1/2009 | Middlemiss et al. |
| 2009/0070841 | A1 | 3/2009 | Buga et al. |
| 2009/0092074 | A1 | 4/2009 | Jamalipour et al. |
| 2009/0100476 | A1 | 4/2009 | Frisco et al. |
| 2009/0103473 | A1 | 4/2009 | Foster et al. |
| 2009/0197595 | A1 | 8/2009 | Kauffman et al. |
| 2009/0279490 | A1 | 11/2009 | Alcorn |
| 2009/0318137 | A1 | 12/2009 | Kauffman et al. |
| 2009/0318138 | A1 * | 12/2009 | Zeng et al. ................. 455/431 |
| 2009/0318139 | A1 | 12/2009 | Su |
| 2010/0039984 | A1 | 2/2010 | Brownrigg |
| 2010/0142482 | A1 | 6/2010 | Lu et al. |
| 2010/0157857 | A1 * | 6/2010 | Ku et al. ..................... 370/281 |
| 2011/0280178 | A1 * | 11/2011 | Heifner ....................... 370/325 |

FOREIGN PATENT DOCUMENTS

| | | |
|---|---|---|
| CN | 1579056 A | 2/2005 |
| EP | 1017188 A2 | 7/2000 |
| EP | 1926234 A2 | 5/2008 |
| JP | H03151618 A | 6/1991 |
| JP | 2000209233 A | 7/2000 |
| JP | 2001127682 A | 5/2001 |
| WO | WO-2007051130 | 5/2007 |

OTHER PUBLICATIONS

Sproull et al., "Management and Service Discovery in Satellite and Avionic Networks", IEEE Aerospace Conference, Big Sky, Montana, Mar. 3-10, 2007, pp. 1-13.

Jaeger et al., "A Floating Backbone for Internet over the Ocean", IEEE Distributed Systems Online, vol. 9, No. 12, Dec. 2008, pp. 1-7.

International Search Report and Written Opinion—PCT/US2011/036994—ISA/EPO—Aug. 2, 2011.

* cited by examiner

HYBRID SATELLITE AND MESH NETWORK SYSTEM FOR AIRCRAFT AND SHIP INTERNET SERVICE

CLAIM OF PRIORITY UNDER 35 U.S.C. §119

The present application for patent claims the benefit of U.S. Provisional Application No. 61/345,884 entitled "Hybrid Satellite and Mesh Network System for Aircraft and Ship Internet Service System" filed May 18, 2010, and assigned to the assignee hereof and hereby expressly incorporated by reference herein in its entirety.

BACKGROUND

1. Field

Aspects of the present disclosure relate generally to wireless communication systems, and more particularly, to a hybrid network of mobile mesh network nodes, ground station nodes and satellite nodes.

2. Background

Aircraft traveling over an ocean or over remote land areas may not have access to direct radio links for Internet connectivity via a cable (e.g. copper based cable or fiber). Satellite based Internet service has been available on some aircraft and ships and has been primarily used to provide mission critical connectivity for crew. Where satellite has been used to provide passenger Internet service it has not been able to provide a broadband service to passengers at a viable cost. The high cost of existing attempts at a satellite based broadband service for passengers on aircraft has resulted in coverage for remote aircraft being nonviable.

SUMMARY

Aspects of the present disclosure provide a hybrid network of mobile mesh network nodes, ground station nodes and satellite nodes which improves access by aircraft and ships to ground based networks such as the Internet. Embodiments of the present disclosure provide low cost, high bandwidth Internet connectivity to aircraft and ships that may otherwise be unable to connect to land based base stations due to lack of line of sight communication paths, for example.

The designs described in accordance with aspects of the present disclosure reduce use of expensive satellite bandwidth by building a mesh network among the aircraft, ships, dedicated buoys and land based base stations. In an illustrative embodiment, the system defaults to using links in the mesh network to reach a point of connectivity to the public Internet and uses satellite links only to bridge lapses in connectivity via the mesh network.

In a method for wireless communication according to one aspect of the present disclosure, a first attempt is performed by a first mobile segment node of a hybrid satellite-mesh network to establish a communication path to any ground segment node of the hybrid satellite-mesh network directly or via a second mobile segment node of the hybrid satellite-mesh network. Failure or success of the first attempt by the first mobile segment node is then determined. In response to determining a failure of the first attempt, a second attempt is performed by the first mobile segment node to establish a communication path to any ground segment node of the hybrid satellite-mesh network via a satellite segment of the hybrid satellite-mesh network.

Another aspect of the present disclosure provides a communication network in which a ground segment includes at least one ground segment node in communication with the Internet. A space segment of the network includes at least one space segment node in communication with the ground segment node. A mobile segment of the network includes a number of mobile segment nodes configured to adaptively communicate with each other and with the ground segment node for access to the Internet. The mobile segment nodes may also be configured to communicate with the space segment node only when communication links with ground segment nodes are unavailable directly or via other mobile segment nodes.

DETAILED DESCRIPTION

Figure 1:
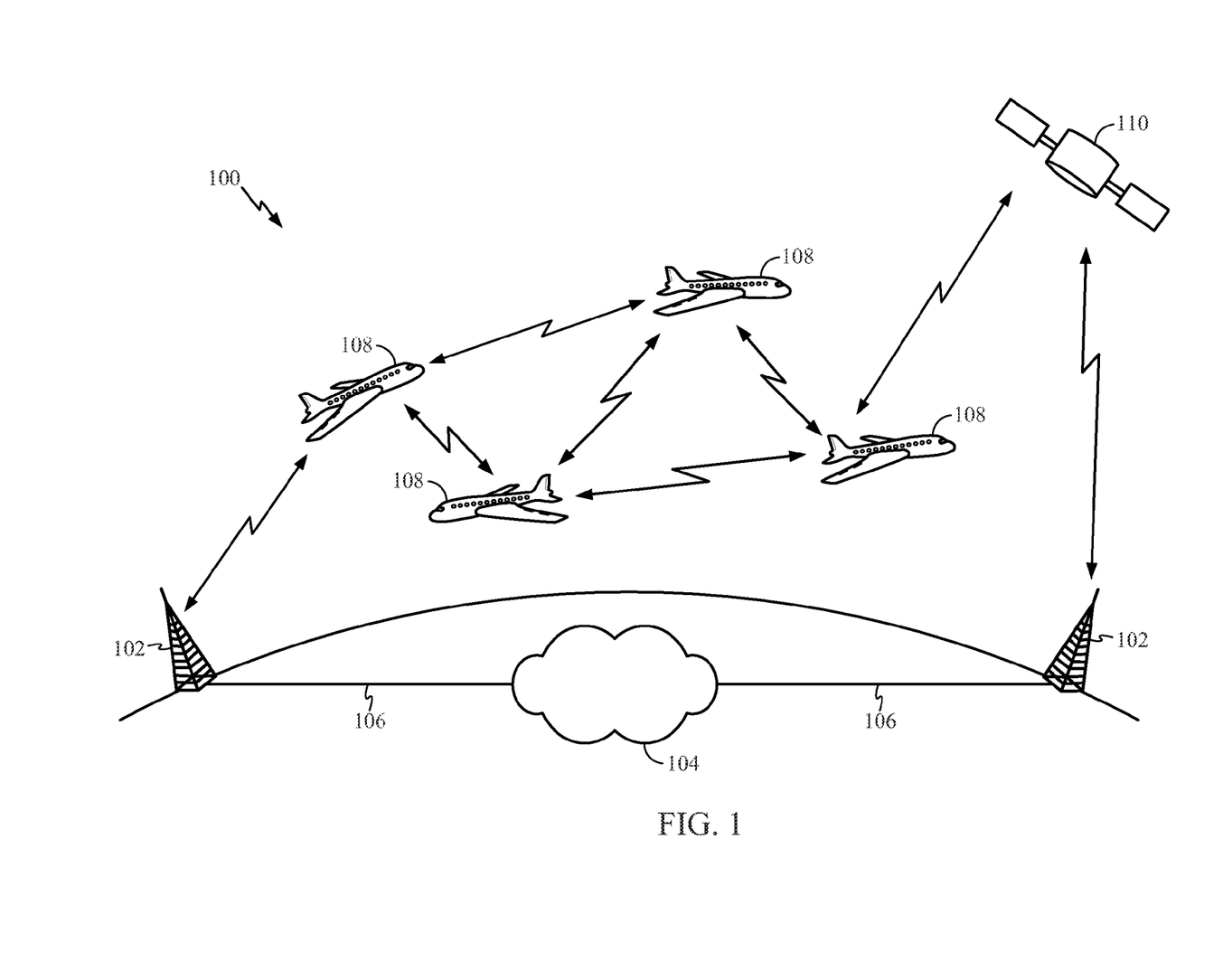
FIG. 1 is a system block diagram of a hybrid mesh network satellite communication system according to an illustrative embodiment of the present disclosure.

A network architecture according to illustrative embodiments of the present disclosure is described with reference to FIG. 1. The network architecture 100 includes a set of nodes 102, 108, 110 divided into three segments: a ground segment, a mobile segment, and a space segment. Each segment can have multiple nodes.

Ground segment nodes include stations 102 that can connect to the Internet 104 via a cable, fiber or satellite backhaul 106. These stations 102 may either be land based ground stations or may be ocean based buoys that connect to fiber running on the ocean floor. In the illustrative embodiments, the nodes in the ground segment have a high bandwidth radio that allows them to communicate with nodes of the mobile segment. Note that some of these land based base stations may connect to the Internet via satellite backhauls where cable or fiber is not available. For satellite backhaul from land base stations one may use a very large antenna to communicate with the satellite. Because of the very large ground station antenna the satellite backhaul cost will be much lower than direct connection from aircraft to satellite. However, it may be desirable to use cable or fiber for backhaul to ground stations wherever possible.

Mobile segment nodes include mobile crafts 108 that are un-tethered and could be in the air or at sea. Specifically, this system design enables connectivity for mobile crafts 108 which do not have a direct line of sight connectivity to a cabled Internet access point on the ground. The nodes in the mobile segment have a mesh radio that allows them to communicate with other nodes of the mobile segment or with the nodes of the cabled segment. The nodes in the mobile segment also have a radio (henceforth satellite radio) that allows them to communicate to the nodes in the space segment described below.

The nodes in the mobile segment use the mesh radio to route Internet data wherever mesh radio links provide a path to the ground segment. If there is no route to the Internet via ground stations 102, then the nodes in the mobile segment use the satellite radio to route Internet data via nodes in the space segment. If the mesh radio links cannot reach the ground segment and no satellite is visible, the nodes in the mobile segment will route Internet data via the mesh radio to another mobile node that does have visibility to a satellite.

Space segment nodes include satellites 110 that can relay data to the Internet via satellite ground gateways.

Together, the ground segment, mobile segment and space segment can achieve high levels of connectivity for the mobile nodes while routing a vast majority of the traffic via the mesh network to the ground segment and then onto the Internet. The satellite component may be expected to have relatively high capital expenditure costs whereas the mesh nodes may have much lower capital expenditure costs. Therefore, aspects of the present disclosure reduce the overall cost by seeking to increase or maximize the amount of traffic sent through the mesh network. The mesh network component, therefore, helps reduce or minimize the network cost and make the Internet to craft service affordable. The satellite component helps provide ubiquity and fill any holes that the mesh network may have. In other words, the satellite component provides robustness to the service where mesh nodes do not have a route to the Internet through a ground station 102. The result is a system that is highly robust and cost effective.

In an illustrative embodiment a network may include a small number e.g., 20-40 ground stations 102 that constitute the ground segment. The mobile segment can consist of several different combinations of commercial airlines. The space segment can be a geostationary satellite system such as Inmarsat operating in the L band or a Ku band satellite system, for example.

Although the illustrative embodiments described in the present disclosure are primarily described as using aircraft as mobile nodes, it should be understood that the same embodiments may also include other mobile nodes such as ships and cars, for example.

According to aspects of the present disclosure, each aircraft in a network is configured to communicate with multiple other aircrafts and in some cases with a ground station. In an illustrative embodiment, each aircraft has at least two transceiver/antenna systems to help provide links in the mesh network in at least two general directions, one to nodes in front of the aircraft and one to nodes behind the aircraft. Multiple mesh radio transceiver/antenna systems are used on each aircraft because a single mesh radio transceiver/antenna for each aircraft may not provide sufficient visibility to other aircraft (nodes) to facilitate creation of a continuous mesh radio route to a ground station.

Each of the mesh network transceiver systems on a given aircraft may be considered to be a node itself. The term "node" in the mobile network may refer to any of the two or more mesh network transceiver systems that may be installed on the same aircraft. Each node, upon receiving data from another node, routes the data to a node in the mesh network according to a routing algorithm designed to improve on or optimize a certain criterion. Each aircraft may receive data from multiple nodes and multiplex the data received from multiple nodes into a stream sent to another node on its route to a ground station in the network.

Figure 2:
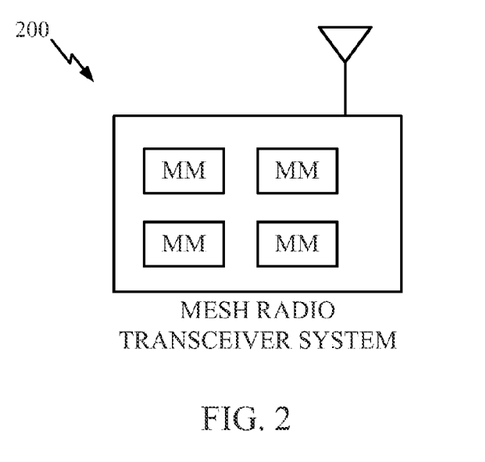
FIG. 2 is a system block diagram of a mesh radio transceiver system according to an illustrative embodiment of the present disclosure.

Referring to FIG. 2, each mesh network transceiver system 200 may include multiple Modem Modules (MMs). According to aspects of the disclosure, each MM supports at least two modes, an Access Terminal (AT) mode and an Access Point (AP) mode. In the AT mode, the MM searches for another AP node in the network with which to associate. In the AP mode, the MM solicits other nodes that may be searching for a node with which to associate. Each transceiver may support multiple MMs. Therefore, each node may establish multiple AP or AT links by instantiating multiple MMs in hardware and/or software, for example.

Figure 3A:
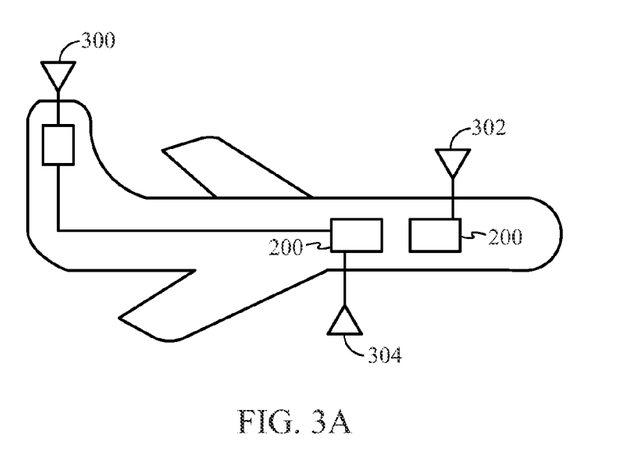
FIGS. 3a-3b are system block diagrams of aircraft having mesh network antennas and satellite antennas according to illustrative embodiments of the present disclosure.

Referring to FIG. 3a, according to aspects of the present disclosure, a satellite radio transceiver system 300 is also installed on aircraft in the mobile segment. The satellite radio transceiver system 300 is coupled to one or more of the mesh network transceiver systems 200 in the aircraft. In certain embodiments, a satellite radio receiver is installed on each aircraft in the mesh network. Other embodiments may include aircrafts which do not have their own satellite radio transceiver system 300. These aircrafts may rely on mesh radio links to other aircrafts equipped with satellite radio transceiver systems 300 for establishing communication via the space segment, for example.

The mesh network transceiver systems 200 each include at least one antenna so that each aircraft will have at least two mesh network antennas. The two antennas may allow a given aircraft to establish connectivity with aircrafts flying in front of it as well as aircrafts flying behind it. In one antenna configuration, a first mesh network antenna 302 is located on top of the aircraft and a second mesh network antenna 304 is located on the bottom of the aircraft. In situations where one aircraft is flying at a higher altitude in front of another aircraft, this configuration allows an antenna on the top of the aircraft flying behind to have a view toward the antenna on the belly of the aircraft flying in front.

Figure 3B:
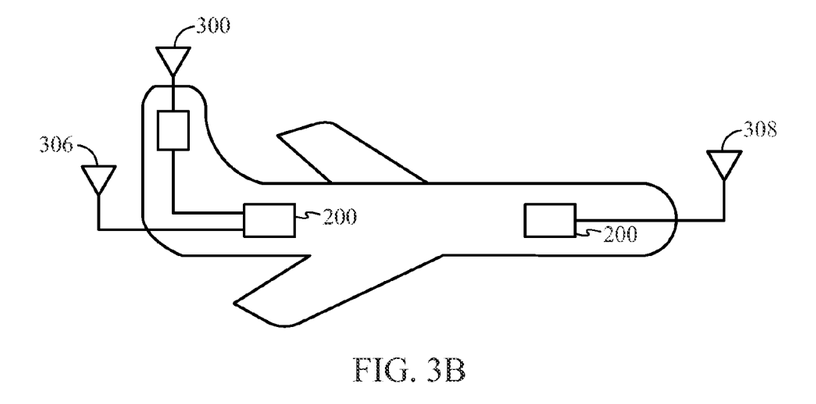

Another antenna placement configuration shown in FIG. 3b locates a first mesh network antenna 306 in the tail of the aircraft and a second mesh network antenna 308 in front of the aircraft. In this configuration the two aircrafts may be either connected via one antenna 306 in the tail of one aircraft and an antenna 308 in front of the other aircraft. For example, using this antenna configuration, an aircraft ahead of and below another aircraft uses its tail antenna to communicate with the front antenna of the trailing aircraft.

According to illustrative embodiments of the disclosure, ground station nodes may also include one or more mesh radio receiver systems 200 and may function as part of the mesh network along with mobile station nodes. The ground station nodes also may be directly connected to a wide area network such as the Internet via cable connections, for example.

Figure 4:
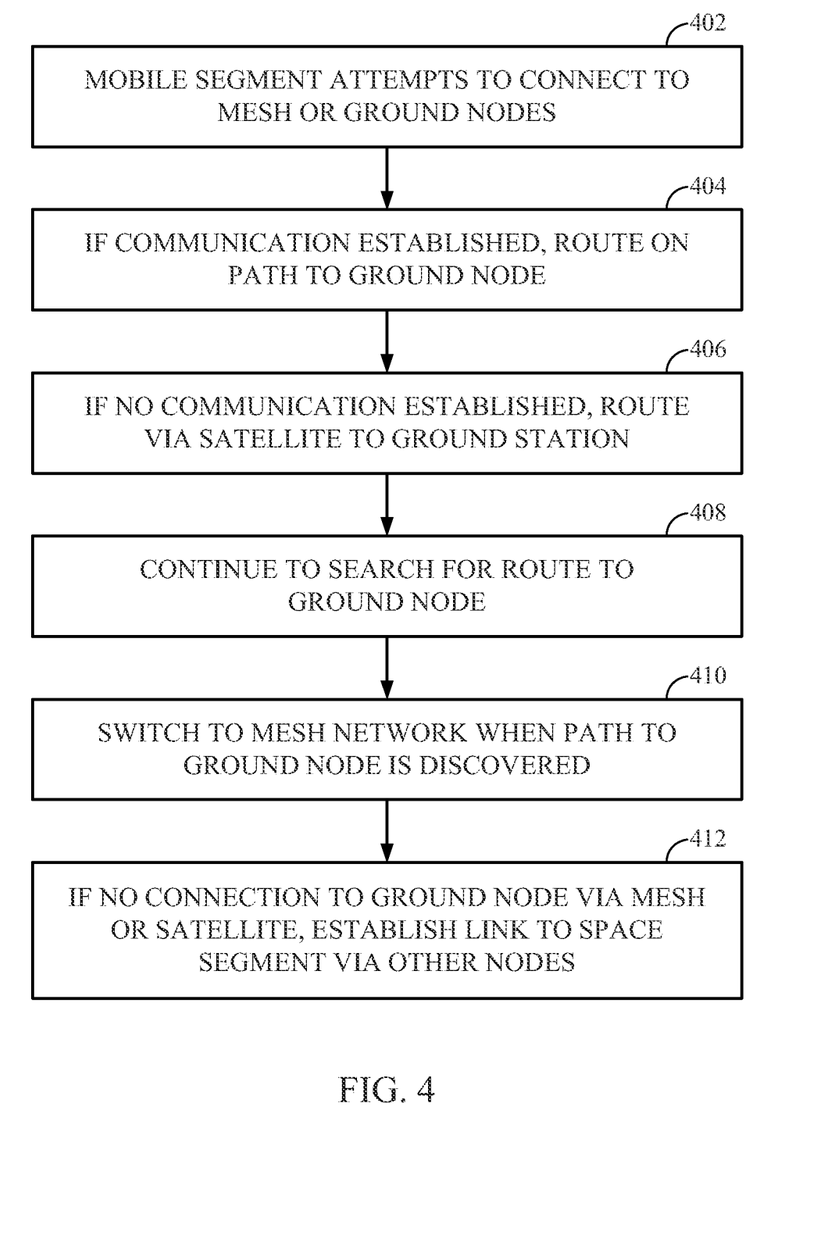
FIG. 4 is a process flow diagram of a method for wireless communication over a hybrid satellite and mesh network system for aircraft and ship Internet service according to an illustrative embodiment of the present disclosure.

Aspects of the present disclosure include a method for wireless communication over a hybrid satellite and mesh network system for aircraft and ship Internet service. Referring to FIG. 4, in block 402, a mobile segment node attempts to establish a communication path to the Internet either directly via a ground segment node, or via other mobile segment nodes in the mesh network. If a communication path is established, then packets are routed on the path between the mobile segment node(s) and the ground segment node in block 404.

When a mobile segment node can not establish a route to the Internet through the mesh network nodes, it then attempts to establish communication with the Internet through a link to a space segment node and begins to route packets via a satellite to a ground station, for example in block 406. Meanwhile in block 408, mobile segment nodes continue searching for possible routes to the ground segment nodes. In block 410, as soon as a route to a ground segment node is discovered by a mobile segment node, the mobile segment nodes change their routing from satellite node to the mesh network.

Every mobile segment nodes may not always be able to establish communication with a space segment node. For example, when an aircraft has very low elevation angle to a satellite, such as on the north pole, the aircraft cannot directly connect to the satellite. In block 412, when a mobile segment node can not establish communication to a ground segment node via the mesh network, and can not establish communication with a space segment node, the node may establish a link to a space segment node via other nodes in the mesh network having a connection to the space segment node.

According to an aspect of the disclosure, all possible routes to the Internet, through terrestrial base stations, or through satellite links may be provided to a routing algorithm. The routing algorithm determines a good or best route for traffic from a specific mobile node. In other words, each aircraft or mesh network node may establish links with other aircraft or other mesh network nodes as well as with one or more satellites in the space segment. These links are input to a routing algorithm with certain constraints. In one example, the constraints may include the cost of a specific link as well as its data rate and its delay. The routing algorithm determines a route that improves or optimizes a certain criterion such as minimum delay subject to certain cost constraints. In an illustrative embodiment, once the potential links between the aircraft and other mesh network nodes and satellite(s) are established then the routing algorithm is reduced to existing Internet protocol and routing algorithms.

Aspects of the present disclosure provide a method for the discovery of the nodes in a mesh network and for providing the candidate links to a routing algorithm. The routing algorithm may be substantially the same as routing algorithms that are widely used for routing Internet traffic.

Aspects of the present disclosure include multiple access protocols for connecting the mobile segment nodes to each other and to the ground segment nodes. Frequency Division Multiple Access (FDMA), OFDMA (Orthogonal Frequency Division Multiple Access), Time Division Multiple Access (TDMA), Code Division Multiple Access (CDMA) or a combination of these schemes may be used. A number of possible approaches may be used to increase or maximize bandwidth efficiency of the available spectrum according to aspects of the disclosure.

Interference in the network may be reduced by imposing a frequency reuse pattern in the mesh network. The reduced interference may allow an increased data rate between mobile segment nodes. According to this technique, the available bandwidth is divided into a number of sub-bands with center frequencies $f_i$, i=1, . . . , N. Each node may operate on a number of frequencies Two nodes may transmit and receive from each other on the same frequency in a Time Division Duplex (TDD) fashion or may receive and transmit on different frequencies in a Frequency Division Duplex (FDD) fashion. The frequency reuse pattern imposes an FDMA scheme on the system.

Embodiments of the present disclosure include a method for a node to initially discover other nodes in the mesh network. This may be used, for example, in a situation where an aircraft has reached altitude and has turned its transceivers on. The aircraft searches for other nodes in the mesh network and establishes links with a set of nodes in order to establish an efficient route to the Internet.

Figure 5:
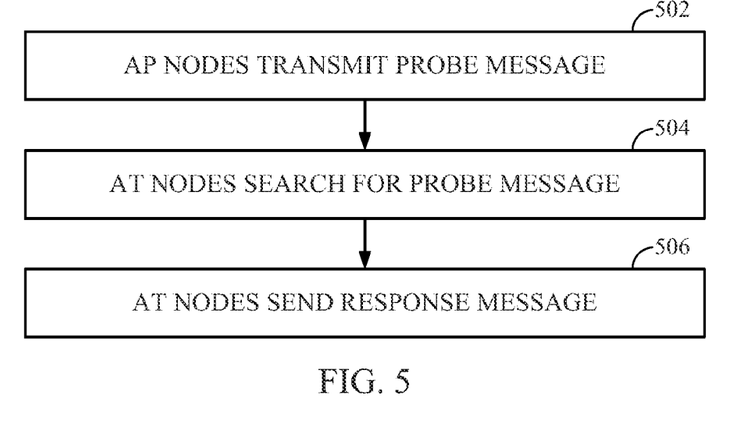
FIG. 5 is a process flow diagram of a method for a new AP node to discover other nodes in a mesh network according to illustrative embodiments of the present disclosure.

A method for a new AP node to discover other nodes in a mesh network according to an illustrative embodiment of the disclosure is described with reference to FIG. 5. In block 502, each AP node in the network transmits a probe message in a predetermined time slot and in a periodic fashion. The probe message contains information regarding the parameters of the AP node. According to aspects of the disclosure, each AP node uses a node specific pilot signal pattern as part of its probe message transmission. In block 504, this pilot signal pattern is used by AT nodes in the network to search for the node's probe message. The ATs may send their response message to the AP from which they receive the prose message in a specified time slot. More generally, in block 506, the response message may be sent on a multiplex access channel supported by the AP.

If any AT node that has detected the probe message wishes to establish a link with the detected AP node, it will send its link association request in the response slot/message to the detected AP node. The transmitter and receiver in this system use directional antennas adjusted to increase or maximize the data rate between two ends of a link. Therefore, the probe and associated pilot signal should be sent on a broad beam so that they may be received by a large number of aircrafts/nodes in the network.

In an alternative embodiment, the pilot signal pattern and probe signals may be sent sequentially on different narrow beams to allow all nodes in the vicinity of the sending mobile segment node to receive the probe message. According to aspects of the disclosure, two types of pilot signals may be sent. One is a broadcast pilot signal for the purpose of node discovery as described above, and the other is a pilot signal that is dedicated between two ends of a particular link during data transmission. This allows the receiver to make channel estimates for demodulation purposes and to make link specific signal to interference plus noise ratio (SINR) measurements for rate control and power control.

Figure 6:
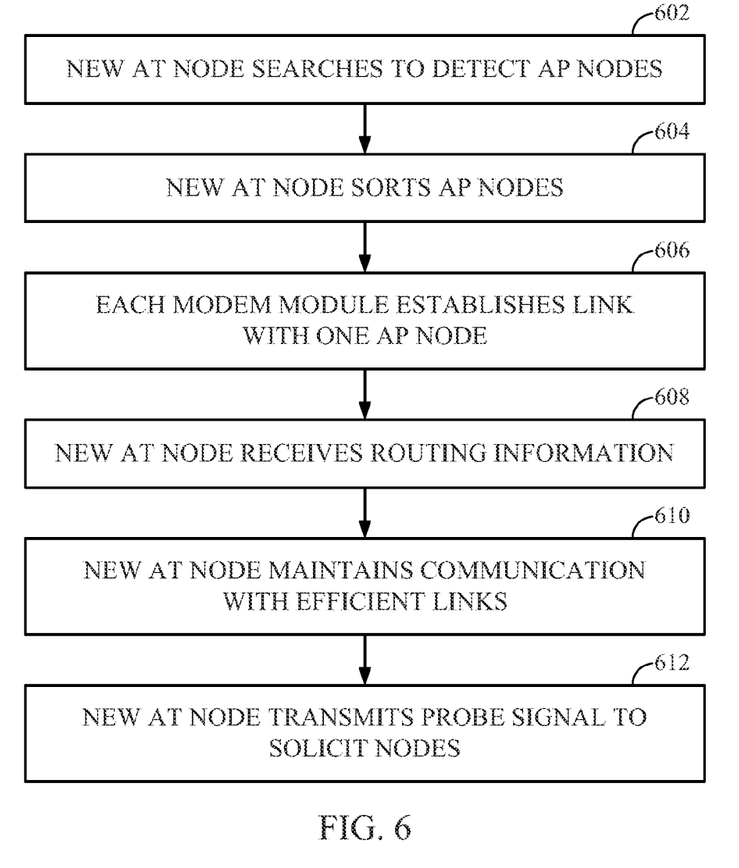
FIG. 6 is a process flow diagram of a method for detecting existing AP nodes by a new AT node according to illustrative embodiments of the present disclosure.

A method for detecting existing AP nodes by a new AT node according to an illustrative embodiment of the disclosure is described with reference to FIG. 6. At block 602, a new AT node searches all frequencies and all pilot patterns to detect all existing AP nodes in the network. In block 604, the new AT node then sorts all detected AP nodes according to some metric. For example, one metric for sorting may include the received pilot $C/(N_o+I)$ strength, where C is received carrier power, $N_o$ is thermal noise power and I is total received interference power. In block 606, each MM (Modem Module) instantiation of the new AT node's mesh radio transceiver establishes links with one AP node according to some criterion. For example, one criterion for establishing links with a particular AP node may be the highest $C/(N_o+I)$ strength. The links to an AP may be established using the response message mechanism described above.

In block 608, the new AT node receives routing table information regarding the existing network configuration from the nodes with which it has established links. In block 610, the new AT then maintains communication with the links that provide the most efficient routing and network throughput according to network routing optimization criteria and algorithms. The new AT node is thereby connected to the mesh network through the probe/response message sequences. In block 612, the new node may also transmit its own probe signal in AP mode on a given frequency in order to solicit nodes that are searching for APs with which to associate.

Figure 7:
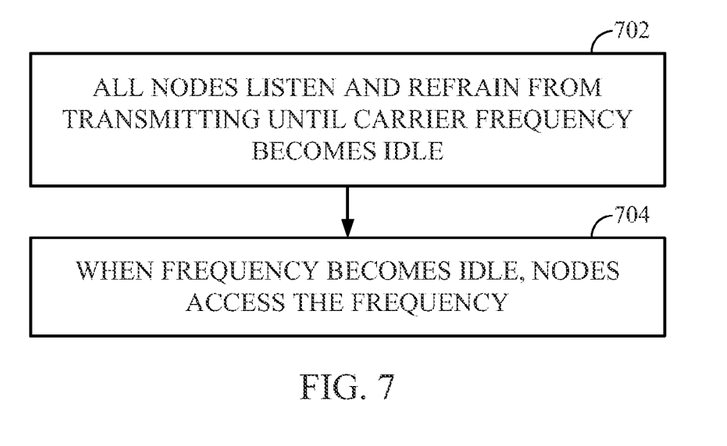
FIG. 7 is a process flow diagram of a Carrier Sense Multiple Access (CSMA) method for scheduling communication from one AP node to multiple AT nodes according to illustrative embodiments of the present disclosure.

Referring to FIG. 7, aspects of the present disclosure provide a Carrier Sense Multiple Access (CSMA) method for scheduling communication from one AP node to multiple AT nodes which may be communicating on the same frequency and using the same pilot sequence. In block 702, all nodes listen to the carrier frequency and refrain from transmitting until the frequency becomes idle. In block 704, when the frequency becomes idle, other nodes may seize the channel according to a random access approach or according to a predetermined mechanism that avoids collision among competing nodes. For example, once the frequency becomes idle, other nodes may sequentially access the frequency one at a time according to a number of possible algorithms.

In an illustrative embodiment, an algorithm for avoiding collisions among competing nodes selects a next transmitting node according to a descending order of nodes' media access control (MAC) address. In this embodiment, once the frequency is found to be idle the node with the highest MAC address will seize the frequency if it has data to send. If the frequency continues to be idle, then the node with the highest MAC address in the remaining set of nodes may attempt to transmit. Various other mechanisms may provide fair arbitration among nodes according to embodiments of the present disclosure. In another illustrative embodiment, for example, each node may be allowed to transmit a maximum number of packets after which it releases the frequency to be used by other nodes.

An alternative to CSMA according to aspects of the present disclosure is central scheduling by the AP. The sharing of the available bandwidth on one carrier frequency by multiple nodes results in a TDMA (Time Division Multiple Access) scheme imposed on top of the previously mentioned FDMA scheme. Note that instead of having multiple ATs communicate with the AP in TDMA fashion on a given assigned bandwidth, the different ATs may communicate with the AP using a CDMA or OFDMA scheme sharing the assigned bandwidth to the AP.

Figure 8:
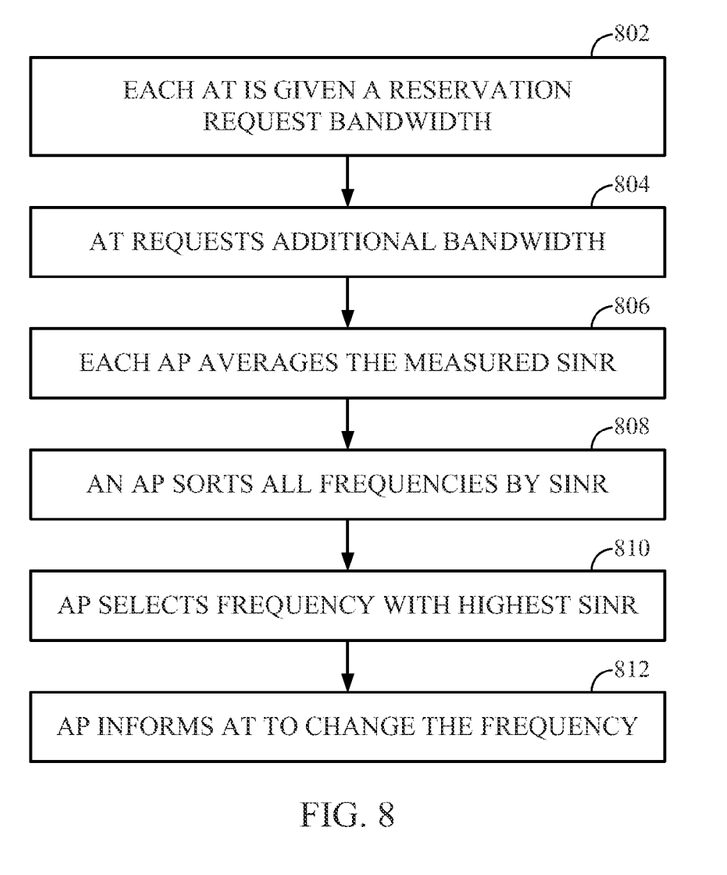
FIG. 8 is a process flow diagram of a method for central scheduling by an AP according to illustrative embodiments of the present disclosure.

A method of central scheduling by the AP according to aspects of the present disclosure is described with reference to FIG. 8. At block 802, each AT is given a reservation request bandwidth. The reservation request bandwidth may be in the form of a time slot in the TDMA approach, or a number of tones in the OFDMA approach, or a code in the CDMA approach. In block 804, the ATs may use the reservation request bandwidth to request additional bandwidth when needed.

According to aspects of the disclosure, a frequency reuse may be imposed on the frequencies that adjacent APs use in order to reduce interference and improve data rates. In block 804, each AP may periodically measure SINR on all pilots and all frequencies transmitted by other APs during the probe message sequence where a broad beam is sent by the AP. Interference in the network is variable and depends on traffic load in the network as well as other path loss variations as antenna mis-pointing, for example. Therefore, in block 806, each AP averages the measured SINR over a number of measurements to average out the interference variations.

In block 808, a given AP may sort all frequencies by their SINR. In block 810, the AP selects a frequency for its AP mode that has the highest SINR. In block 812, the AP informs its associated AT nodes to change the frequency to the newly selected frequency. The request to change the frequency channel may be sent to the ATs in a message that is sent by the AP on the forward link on a broadcast control channel, for example. This will result in an adaptive frequency reuse in the network. In an alternative embodiment, a central processor may determine a frequency reuse pattern for all nodes in the network and send the frequency reuse plan to all nodes.

Figure 9:
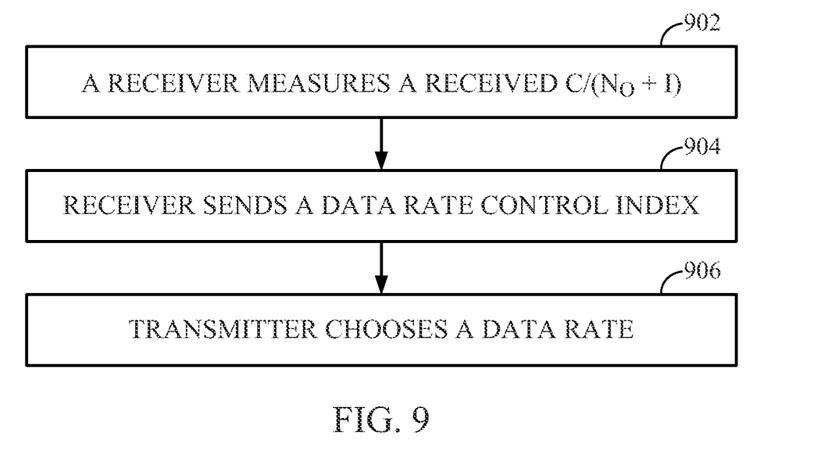
FIG. 9 is a process flow diagram of a method for link level data rate adaption according to illustrative embodiments of the present disclosure.

Aspects of the present disclosure provide a method for adjusting the data rate of a link between each pair of AT/AP mobile segment nodes according to channel and interference conditions on the link. A method for link level data rate adaption according to an illustrative embodiment of the disclosure is described with reference to FIG. 9. In block 902, a receiver measures a received $C/(N_o+I)$. In block 904, the receiver sends a Data Rate Control (DRC) index, representing the received $C/(N_o+I)$, to the transmitter of the received signal. In block 906, the transmitter chooses a data rate for its transmission to the particular node based on the received DRC.

According to illustrative embodiments of the disclosure, in order to increase the bandwidth efficiency of the system, error correction techniques such as Incremental Redundancy (IR) techniques used by 3G/4G systems, for example, may be incorporated into the link adaptation mechanism. The IR techniques encode a given packet and divide the redundancy bits into multiple frames. The first segment of the encoded packet is sent in a frame. If the receiver successfully decodes the frame and recovers the intended packet it sends an acknowledgement to the transmitter. Otherwise the transmitter sends additional redundancy frames for the same packet until the packet is successfully decoded.

In order to reduce or minimize the interference in the mesh network, each link between two mobile segment nodes in the mesh network may be power controlled to meet data rate requirements on the link while transmitting reduced or minimum power. The path loss between mobile segment nodes is a function of multiple factors, such as the orientation of the aircraft, atmospheric losses due to oxygen, water vapor, rain, etc., which can be variable.

Figure 10:
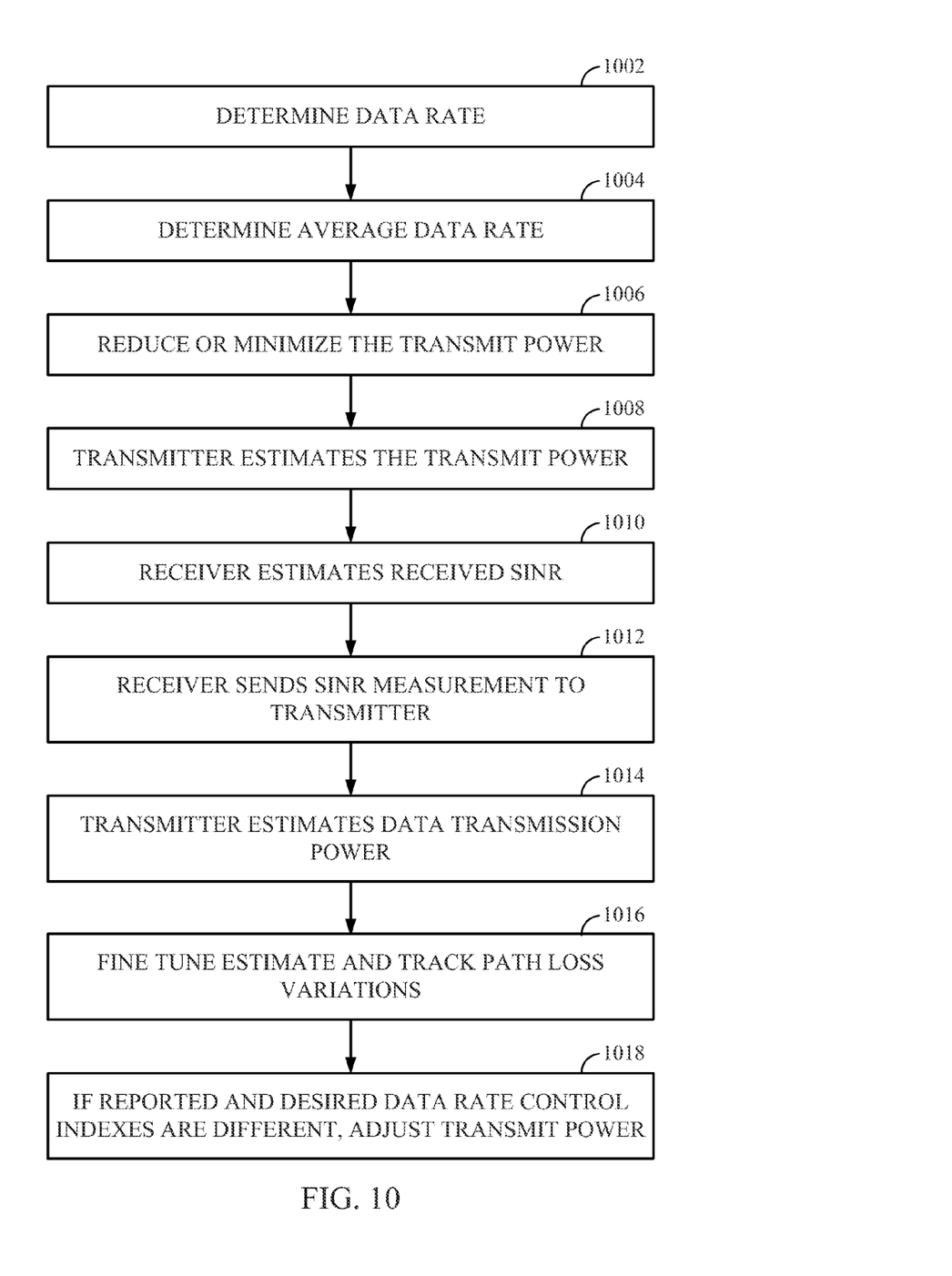
FIG. 10 is a process flow diagram of a method for link level power control in a mesh network according to illustrative embodiments of the present disclosure.

A method for link level power control in a mesh network according to an illustrative embodiment of the disclosure is described with reference to FIG. 10. In block 1002, the desired the data rate between two links to meet the overall throughput requirements of the network is determined. In block 1004, the average data rate that the link will support is determined. In block 1006, a rate control mechanism reduces or minimizes the transmit power as described with reference to FIG. 9. In block 1008, the transmitter on the link initially estimates the transmit power to achieve the desired data rate on the link in an open loop manner. In block 1010, the receiver estimates the received SINR from the measurements that it makes on the pilot signal transmitted by the transmitter.

In block 1012, this SINR measurement is sent back to the transmitter by the receiver on a multiple access or dedicated control channel. In block 1014, the transmitter makes an open loop estimate of what power to send during the data transmission mode so that the desired data rate may be achieved on the link. The open loop estimate is based on the SINR estimate at the receiver and also the knowledge of what power was transmitted on the pilot signal.

In block 1016, a closed loop power control is used during the data transmission mode to fine tune the open loop estimate as well as track any path loss variations due to misalignment of the antennas and atmospheric changes. The closed loop power control is based on the data rate control (DRC) indexes, which are an indirect measure of SINR that the receiver sends to the transmitter. In block 1018, if the DRC index reported by the receiver is different from the desired DRC index then the transmitter adjusts its link transmit power to adjust the DRC index toward the desired level.

According to another aspect of the present disclosure, mobile segment node antennas may be configured to be directional and may be configured to aim a transmit beam's boresight toward the receiving aircraft's antenna. When an AP transmits the probe or other control messages, it uses its broadest beam so that all nodes in the network may receive the broadcast messages. Antenna beams may be formed by properly phasing multiple antenna elements, i.e., using phased array beam forming, based on phased array beam forming coefficients, for example.

Figure 11:
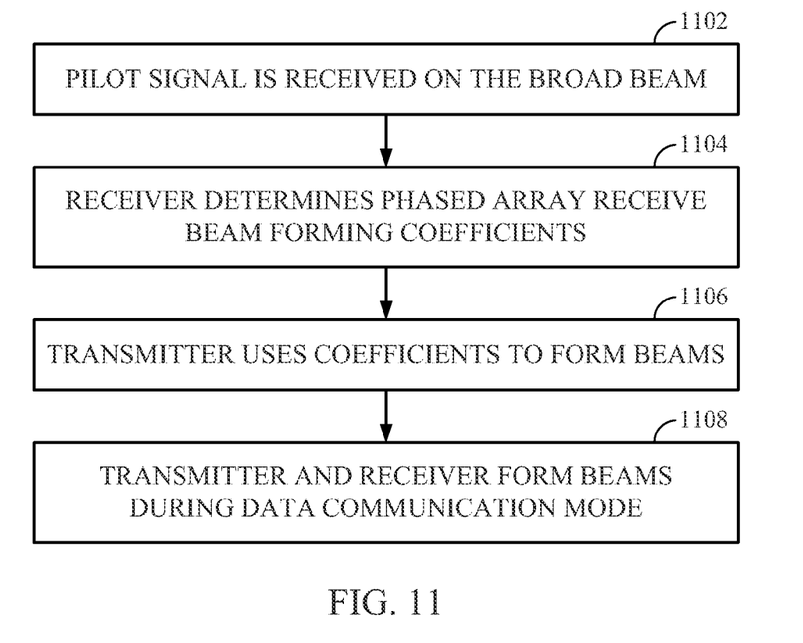
FIG. 11 is a process flow diagram of a method for adaptively adjusting the beam to maximize a link data rate according to illustrative embodiments of the present disclosure.

A method for adaptively adjusting the beam to maximize a link data rate according to an illustrative embodiment is described with reference to FIG. 11. In block 1104, a pilot signal is received on the broad beam. In block 1104, the pilot signal is used by the receiver to determine phased array receive beam forming coefficients.

According to one aspect of the disclosure, a TDD technique is used in which both ends of the link transmit and receive on the same frequency and the propagation channel is reciprocal in both directions. Therefore, in block 1106, when TDD duplexing is used, the transmitter may also use the determined phased array receive beam forming coefficients to form beams in the transmit direction. In block 1108, the transmitter and receiver will form beams during the data communication mode using the coefficients that were determined during the broadcast time slots where pilots are sent on the broadest beam.

Figure 12:
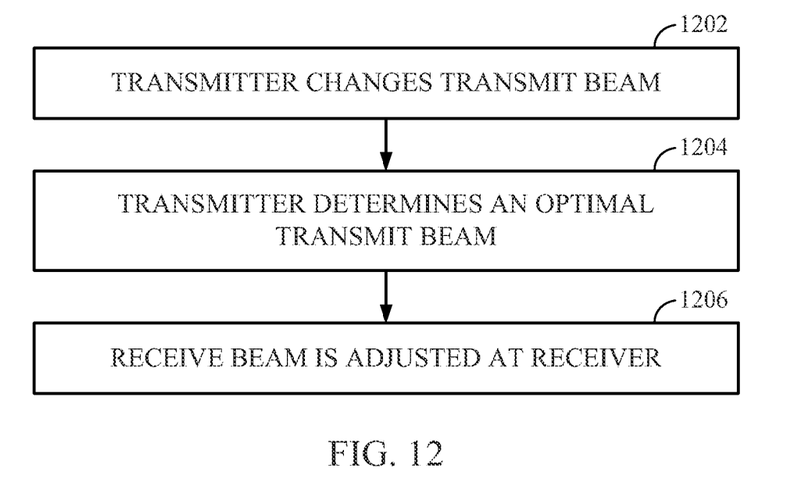
FIG. 12 is a process flow diagram of a method for beam forming in an FDD duplexing scheme according to illustrative embodiments of the present disclosure.

In another embodiment, an FDD duplexing scheme may be used in which the transmit and receive frequencies are different and the propagation channel may be different in the two directions. In this case, a feedback mechanism may be used between the transmitter and receiver to determine the best transmit and receive beams. A feedback method for beam forming in an FDD duplexing scheme according to an illustrative embodiment of the disclosure is described with reference to FIG. 12. This method to determine a good or best transmit beam uses a DRC feedback mechanism, such as the closed loop method that was described with reference to FIG. 10. In block 1202, the transmitter sequentially changes its transmit beam. In block 1204, the transmitter determines an optimal transmit beam based on the received DRC index from the other node. In block 1206, the receive beam is adjusted at the receiver to increase or maximize the received SINR Besides the DRC mechanism, other feedback schemes between the transmitter and receiver may also be used to adjust the transmit beam to achieve the highest SINR in accordance with alternative embodiments of the disclosure. Since the DRC mechanism may also be used for power control purposes as described with reference to FIG. 10, the transmitter does not simultaneously adjust power and its transmit beam in order to ensure proper adjustment to the received DRC index.

According to aspects of the disclosure, antennas of ground segment nodes such as at a base station may have a much higher gain than the antennas on the mobile segment nodes. This allows increased data rates on links between mobile segment nodes, such as aircraft, and ground segment nodes such as terrestrial base stations. Since the links between the aircraft and ground stations carry more traffic than links between aircraft, the data rate requirement on aircraft to ground links can be quite high.

The use of higher gain antennas on ground segment nodes may result in a very narrow beam width for the base station antennas. Aspects of the present disclosure provide a method of adjusting the beams toward the desired aircraft from the base station and vice versa. Aspects of the disclosure also provide a method for detecting new nodes near the base stations.

Figure 13:
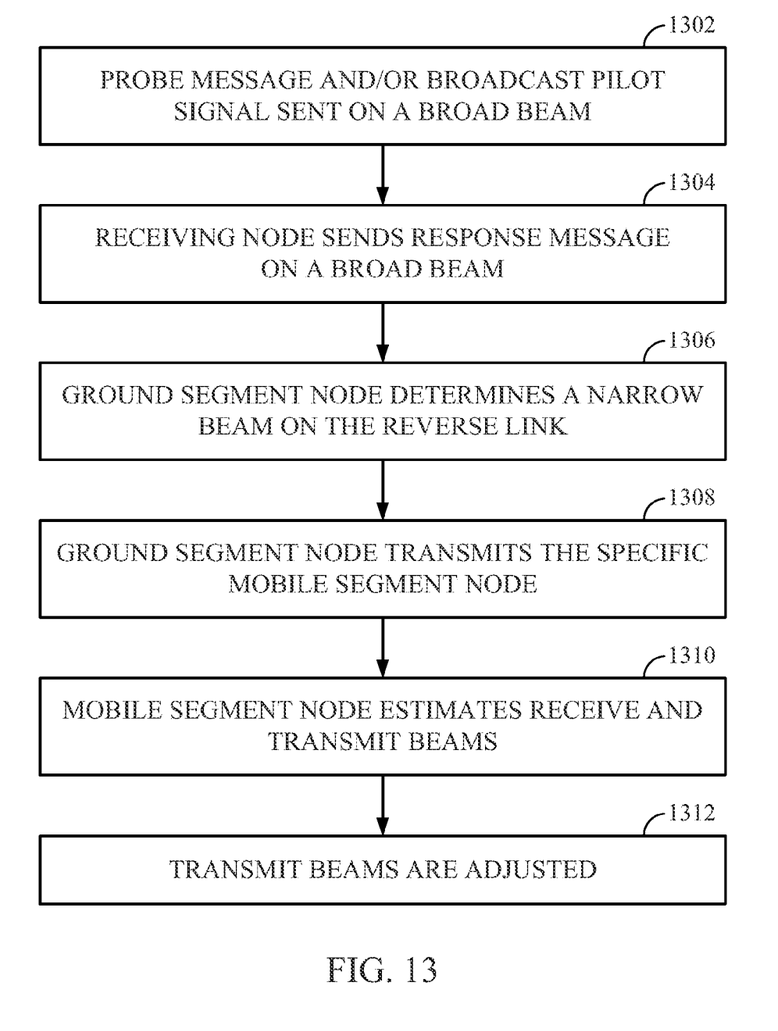
FIG. 13 is a process flow diagram of a method for adjusting beams between a ground segment node and a mobile segment node according to illustrative embodiments of the present disclosure.

A method for adjusting beams between a ground segment node and a mobile segment node according to an illustrative embodiment of the disclosure is described with reference to FIG. 13. In block 1302, a ground segment node or a mobile segment node may send a probe message and/or a broadcast pilot signal on a broad beam. This allows other nodes in view to detect the pilots signal and discover the node. Although the broad beam antenna gain is low, it will be adequate for discovery stage because in this stage the data rate is quite low. In block 1304, the node that receives the probe/broadcast pilot from another node will also send its response message on a broad beam. Broad beam transmission of the response message is appropriate because the data rate requirement in this message is low.

In block 1306, during the probe and response phase the ground segment node determines a good or best narrow beam on the reverse link for receiving a specific mobile segment node. In step 1308, the ground segment node uses the determined beam to transmit to the specific mobile segment node. In step 1310, the mobile segment node estimates best receive and transmit beams using SINR measurements from the probe/response phase. In step 1312, the transmit beams are further adjusted in a closed loop manner based on DRC mechanisms such as those described with reference to FIG. 10, during the data transmission mode. This allows the same frequency band to be reused multiple times and may increase throughput from a mesh network to the Internet, for example.

Figure 14:
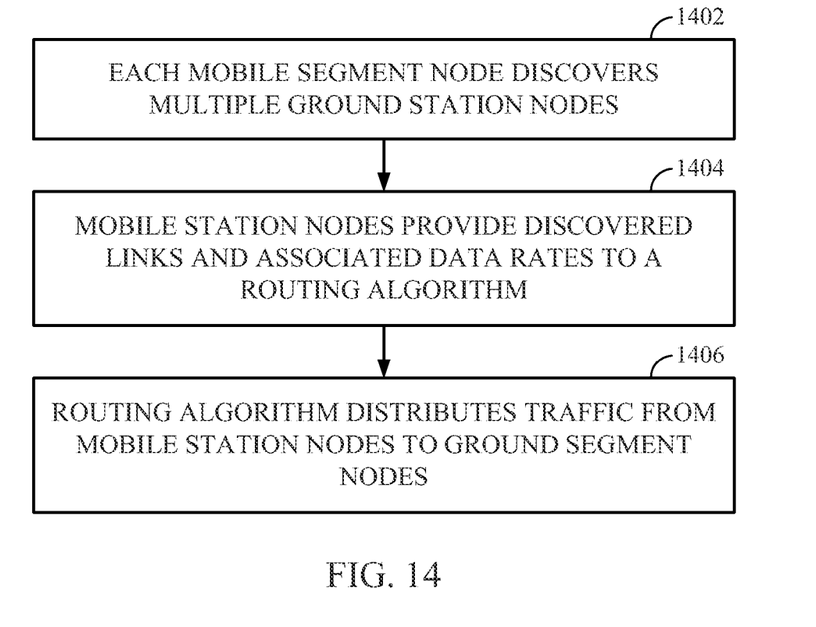
FIG. 14 is a process flow diagram of a method for dividing mobile node to ground node traffic according to illustrative embodiments of the present disclosure.

According to aspects of the disclosure, in addition to using a highly directional antenna in the ground segment nodes, a diversity scheme may divide the traffic from mobile segment nodes to multiple ground segment nodes. Because ground station nodes may be spaced tens of kilometers apart, the mobile segment nodes may form narrow beams toward a specific base station and thereby avoid causing excessive interference to the other base stations. A method for dividing mobile node to ground node traffic according to an aspect of the disclosure is described with reference to FIG. 14. In block 1402, each mobile segment node discovers multiple ground station nodes in a small geographic area. In step 1404, the mobile station nodes provide the discovered links and associated data rates achievable on those links to a routing algorithm. In block 1406, the routing algorithm distributes the traffic from mobile station nodes to ground segment nodes to adjust the load on each link.

The use of multiple ground segment nodes in a small geographical area according to aspects of the present disclosure also provides diversity against atmospheric losses such as losses due to rain. According to the various embodiments described herein, power on each link and data rates on each link can be individually controlled to compensate for various losses, such as losses due to atmospheric conditions, for example.

Figure 15:
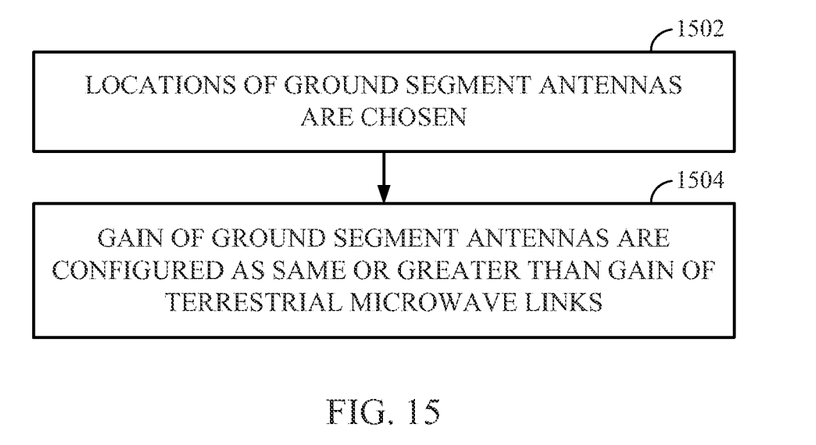
FIG. 15 is a process flow diagram of a method for reducing interference between the mesh network and terrestrial microwave links according to illustrative embodiments of the present disclosure.

The particular spectrum used for a mesh network between mobile segment nodes and from mobile segment nodes to ground segment nodes may also be used by terrestrial microwave links. A method for reducing interference between the mesh network and terrestrial microwave links according to aspects of the present disclosure is described with reference to FIG. 15. This method may reduce interference to below thermal noise levels so that the mesh networks have a negligible impact to the performance of the microwave links. In block 1502, the location of ground segment antennas are chosen so that the ground segment nodes do not interfere with terrestrial microwave links. To reduce or minimize interference from mobile segment nodes, the antenna gain of the mesh network ground segment nodes are configured to be the same or greater than the gain of terrestrial microwave links. The large gain of the mesh network ground station node antennas reduces the transmit power requirement on the mobile segment node transmitters.

In an illustrative embodiment of the disclosure, a mobile segment node may also spread its signal over a larger bandwidth in order to reduce the power spectral density of the signal received at a terrestrial microwave site. The link level power control methods described herein may also be employed to ensure that a signal is received at a certain level on the ground to reduce interference. For example, a target data rate may be chosen for the link from an aircraft to a terrestrial base station. An amount of spectrum larger than the data rate is used for spreading the signal. A combination of open and closed loop power control ensures the signal level received at the base station will achieve the specified data rate.

According to another aspect of the present disclosure, terrestrial microwave antennas may be oriented such that their boresight is aimed away from certain aircraft corridors by some small angular displacement, such as a few degrees, for example. This will result in some antenna discrimination between the microwave link antenna and the aircraft antennas to further reduce the interference from aircraft mesh network transmitters into the microwave link.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   detecting a plurality of moving mobile segment nodes of a hybrid satellite-mesh network by an aircraft node of the hybrid satellite-mesh network, the aircraft node configured with at least two antennas pointing toward at least two different directions and with at least two transceivers, each of the at least two transceivers configured with multiple modem modules, wherein each of the multiple modem modules supports: an access terminal (AT) mode that searches for an access point (AP) node in the hybrid satellite-mesh network with which to establish multiple AT links, and an access point (AP) mode that solicits other nodes that may be searching for a node in the hybrid satellite-mesh network with which to establish multiple AP links, wherein each of the mobile segment nodes comprises a mobile craft in the air or at sea;
   establishing a link with a selected one of the mobile segment nodes by the aircraft node based on network routing optimization criteria and algorithms;
   attempting, by the aircraft node of the hybrid satellite-mesh network, to establish a wireless communication path to any ground segment node of the hybrid satellite-mesh network via the selected mobile segment node of the hybrid satellite-mesh network;
   determining failure or success of the attempting by the first mobile segment node;
   in response to determining failure of the attempting, establishing, by the aircraft node, a link with a satellite segment of the hybrid satellite-mesh network to establish the wireless communication path to a ground segment node of the hybrid satellite-mesh network via the satellite segment of the hybrid satellite-mesh network;
   sending and receiving packets to and from the Internet by the aircraft node over the established wireless communication path via the satellite segment; and
   while sending and receiving packets via the satellite segment, repeatedly attempting by the aircraft node to establish a new wireless communication path to any ground segment node of the hybrid satellite-mesh network via any of the mobile segment nodes.

2. The method of claim 1, further comprising:
   in response to determining success of the attempting, sending and receiving packets to and from the Internet by the aircraft node over the established wireless communication path.

3. The method of claim 1, further comprising:
   in response to determining success of any one of the repeated attempts, discontinuing communication by the aircraft node via the satellite segment.

4. The method of claim 3, further comprising:
   sending and receiving packets to and from the Internet by the aircraft node over the established new wireless communication path.

5. The method of claim 1, in which the predetermined criteria includes a signal to interference plus noise ratio (SINR) of wireless communication links with the mobile segment nodes.

6. A communication network, comprising:
   a ground segment comprising at least one ground segment node in communication with the Internet and with a satellite segment comprising at least one space segment node; and
   a mobile segment comprising a plurality of moving mobile segment nodes, including an aircraft node, configured with at least two antennas pointing toward at least two different directions and with at least one transceiver configured with at least one modem module, wherein the at least one modem module supports: an access terminal (AT) mode that searches for an access point (AP) node in the hybrid satellite-mesh network with which to establish multiple AT links, and an access point (AP) mode that solicits other nodes that may be searching for a node in the hybrid satellite-mesh network with which to establish multiple AP links, wherein each of the mobile segment nodes comprises a mobile craft in the air or at sea, the plurality of mobile segment nodes configured to adaptively communicate with each other and with the at least one ground segment node for access to the Internet, and at least the aircraft node configured to communicate with the at least one space segment node only when wireless communication links with ground segment nodes are out of range directly or via other mobile segment nodes of the plurality of mobile segment nodes;
   in which the mobile segment nodes are configured:
      to transmit probe signals for discovery by other mobile segment nodes;
      to receive response messages from the other mobile segment nodes; and
      to establish a wireless communication link with the other mobile segment nodes
   in response to receiving the response messages based on network routing optimization criteria and algorithms;
      to send and receive packets to and from the Internet by the aircraft node over the established wireless communication path via the satellite segment; and
      while sending and receiving packets via the satellite segment, to repeatedly attempt to establish a new wireless communication path to any ground segment node of the hybrid satellite-mesh network via any of the mobile segment nodes.

7. The network of claim 6, in which the mobile segment nodes are configured to adaptively reuse frequencies based on a measured signal to interference plus noise ratio (SINR) of a wireless communication link.

8. The network of claim 6, in which the mobile segment nodes are configured to adaptively change a link level data rate in response to signal to interference plus noise ratio (SINR) measurements on a link corresponding to another of the mobile segment nodes.

9. The network of claim 8, in which the mobile segment nodes are configured to adaptively change a link level power level as a function of the link level data rate.

10. The network of claim 6, in which the two antennas are adaptive beam forming antennas, to direct beams toward other mobile segment nodes of the mobile segment nodes.

11. The network of claim 10, in which the mobile segment nodes are configured to send probe messages on a wide beam, and to receive responses on a directed beam.

12. The communication network of claim 6, in which the predetermined criteria includes a signal to interference plus noise ratio (SINR) of wireless communication links with the mobile segment nodes.

13. An apparatus for wireless communication comprising:
at least one processor; and
a memory coupled to the at least one processor, the at least one processor being configured:
to detect a plurality of moving mobile segment nodes of a hybrid satellite-mesh network by an aircraft node of the hybrid satellite-mesh network, the aircraft node configured with at least two antennas pointing toward at least two different directions and with at least one transceiver configured with at least one modem module, wherein the at least one modem module supports: an access terminal (AT) mode that searches for an access point (AP) node in the hybrid satellite-mesh network with which to establish multiple AT links, and an access point (AP) mode that solicits other nodes that may be searching for a node in the hybrid satellite-mesh network with which to establish multiple AP links, wherein each of the mobile segment nodes comprises a mobile craft in the air or at sea;
to establish a link with a selected one of the mobile segment nodes by the-aircraft node based on network routing optimization criteria and algorithms;
to perform an attempt, by the aircraft node of the hybrid satellite-mesh network, to establish a wireless communication path to any ground segment node of the hybrid satellite-mesh network via the selected second mobile segment node of the hybrid satellite-mesh network;
to determine failure or success of the attempt by the aircraft node;
to establish, by the aircraft node, a link with a satellite segment of the hybrid satellite-mesh network to establish the wireless communication path to a ground segment node of the hybrid satellite-mesh network via the satellite segment of the hybrid satellite-mesh network in response to determining failure of the attempting;
to send and receive packets to and from the Internet by the aircraft node over the established wireless communication path via the satellite segment; and
while sending and receiving packets via the satellite segment, to repeatedly attempt to establish a new wireless communication path to any ground segment node of the hybrid satellite-mesh network via any of the mobile segment nodes.

14. The apparatus of claim 13 in which the processor is configured:
to send and receive packets to and from the Internet by the aircraft node over the established wireless communication path in response to determining success of the attempting.

15. The apparatus of claim 13 in which the processor is configured:
to send and receive packets to and from the Internet by the aircraft node over the established wireless communication path via the satellite segment; and
to repeatedly attempt, by the aircraft node, to establish a new wireless communication path to any ground segment node of the hybrid satellite-mesh network via any of the second mobile segment nodes while sending and receiving packets via the satellite segment.

16. The apparatus of claim 15 in which the processor is configured:
to discontinue communication by the aircraft node via the satellite segment in response to determining success of any one of the repeated attempts.

17. The apparatus of claim 16 in which the processor is configured:
to send and receive packets to and from the Internet by the aircraft node over the established new communication path.

18. The apparatus of claim 13, in which the predetermined criteria includes a signal to interference plus noise ratio (SINR) of wireless communication links with the mobile segment nodes.

19. A computer program product for wireless communications in a wireless network, comprising:
a non-transitory computer-readable medium having program code recorded thereon, the program code being executed by a processor:
to detect a plurality of moving mobile segment nodes of a hybrid satellite-mesh network by an aircraft node of the hybrid satellite-mesh network, the aircraft node configured with at least two antennas pointing toward at least two different directions and with at least one transceiver configured with at least one modem module, wherein the at least one modem module supports: an access terminal (AT) mode that searches for an access point (AP) node in the hybrid satellite-mesh network with which to establish multiple AT links, and an access point (AP) mode that solicits other nodes that may be searching for a node in the hybrid satellite-mesh network with which to establish multiple AP links, wherein each of the mobile segment nodes comprises a mobile craft in the air or at sea;
to establish a link with a selected one of the mobile segment nodes by the aircraft node based on network routing optimization criteria and algorithms;
to attempt, by the aircraft node of the hybrid satellite-mesh network, to establish a wireless communication path to any ground segment node of the hybrid satellite-mesh network via the selected mobile segment node of the hybrid satellite-mesh network;
to determine failure or success of the attempt by the aircraft node;
to establish, by the aircraft node, a link with a satellite segment of the hybrid satellite-mesh network to establish the wireless communication path to a ground segment node of the hybrid satellite-mesh network via the satellite segment of the hybrid satellite-mesh network in response to determining failure of the attempt;
to send and receive packets to and from the Internet by the aircraft node over the established wireless communication path via the satellite segment; and
to repeatedly attempt to establish a new wireless communication path to any ground segment node of the hybrid satellite-mesh network via any of the mobile segment nodes while sending and receiving packets via the satellite segment.

20. The computer program product of claim 19, in which the predetermined criteria includes a signal to interference plus noise ratio (SINR) of wireless communication links with the mobile segment nodes.

* * * * *